United States Patent [19]

Kawakami

[11] 4,298,183
[45] Nov. 3, 1981

[54] WATER TAP

[75] Inventor: Youichi Kawakami, Hamamatsu, Japan

[73] Assignee: Mizue Kawakami, Hamamatsu, Japan

[21] Appl. No.: 127,128

[22] Filed: Mar. 4, 1980

[30] Foreign Application Priority Data

Mar. 13, 1979 [JP] Japan ................................ 54-31926[U]

[51] Int. Cl.³ .................... F16K 31/524; G05G 5/06
[52] U.S. Cl. ........................................ 251/263; 74/54;
74/531; 251/297
[58] Field of Search ................ 74/54, 531; 251/242,
251/244, 245, 246, 251, 252, 257, 262, 263, 285,
297, 243

[56] References Cited

U.S. PATENT DOCUMENTS

| 832,589 | 10/1906 | Brown | 251/263 |
| 1,609,879 | 12/1926 | Messmer | 251/263 |
| 2,035,202 | 3/1936 | Smith | 251/263 |
| 2,580,553 | 1/1952 | King | 251/263 |
| 2,626,529 | 1/1953 | Quoss | 74/531 |
| 2,646,248 | 7/1953 | Cornelius | 251/263 |
| 2,715,010 | 8/1955 | Reeves | 251/263 |
| 3,015,420 | 1/1962 | Chudrow | 251/263 |
| 3,809,124 | 5/1974 | Nelson | 251/251 |
| 3,903,926 | 9/1975 | Constantinesco | 251/251 |
| 4,076,209 | 2/1978 | Kilgariff | 251/251 |

FOREIGN PATENT DOCUMENTS 1526628  9/1978  United Kingdom ................ 251/251

Primary Examiner—Martin P. Schwadron
Assistant Examiner—G. L. Walton
Attorney, Agent, or Firm—Bacon & Thomas

[57] ABSTRACT

A main body has a partition wall provided in the interior of the main body and a communication hole formed in the wall. A valve body is disposed in the main body to be movable between a first position and a second position. At the first position the valve body closes the hole, and at the second position the valve body opens the hole. A spring urges the valve body into the second position. An operating lever is connected in a universal-joint fashion to the main body. A cam is formed on the lever and slidably contact with a cam contact element disposed on the valve body in a position away from a plane including a center axis of the main body. A pair of grooves are formed on the lever at each side of the cam and extend along the plane. A pair of projections are provided on the valve body and inserted into the grooves. When the lever is rotated in one or the other direction in the plane by an external force, the valve body is moved between the first and the second position by the action of the cam. When the external force is removed, the lever rotated in a direction transverse to the plane and the projections are frictionally engaged with the lever from rotating in the plane.

6 Claims, 4 Drawing Figures

FIG. 4
FIG. 3
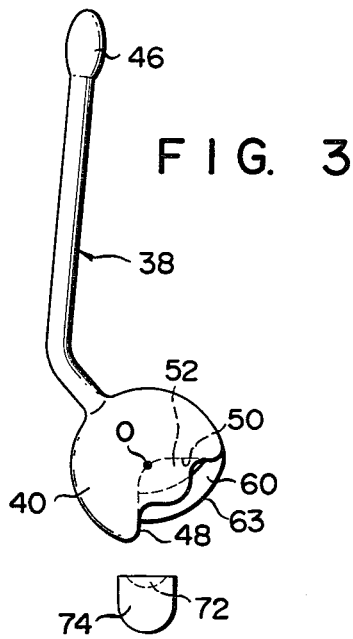
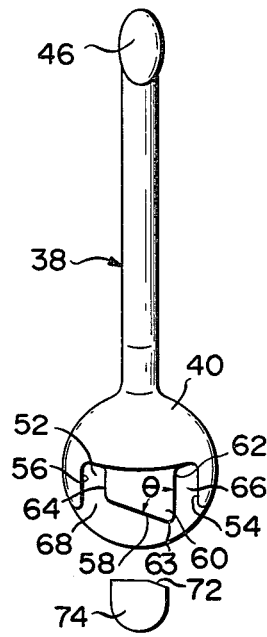
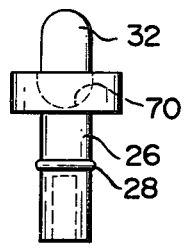
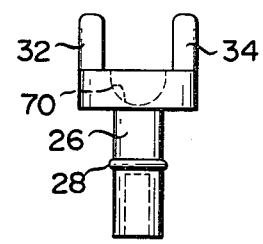
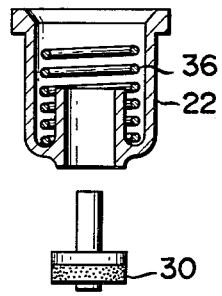
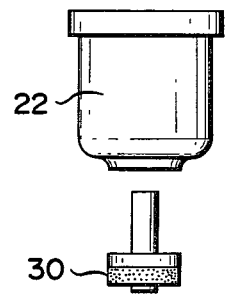

WATER TAP

BACKGROUND OF THE INVENTION

This invention relates to a water tap and in particular a water tap in which when an operating lever is rotated in one and the other direction in one plane present along a center axis of said water tap body a valve body can be moved to a first position in which it closes a communication hole of the water tap body in a watertight fashion and to a second position in which it opens said communication hole.

A conventional water tap of the above-mentioned type has the advantage of positively moving a valve body to first and second positions by a relatively small force for a relatively brief time period. However, it is difficult to maintain the valve body in any position other than a fully opened and a closed state for a relatively long time period and thus it is difficult to maintain a given volume of water per unit time constant for a relatively long time period.

SUMMARY OF THE INVENTION

It is accordingly an object of this invention to provide a water tap which is simpler in construction and can maintain a valve body in any arbitrary position other than a fully opened and a closed state without impairing the above-mentioned advantage.

BRIEF DESCRIPTION OF THE DRAWINGS

This invention will be described below by way of example by reference to the accompanying drawings in which:

FIG. 3 is an exploded side view showing a major section of the water tap of FIG. 1; and FIG. 4 is a front view showing the water tap of FIG. 3.

DETAILED DESCRIPTION OF THE PREFERRED EMBODIMENT

Figure 1:
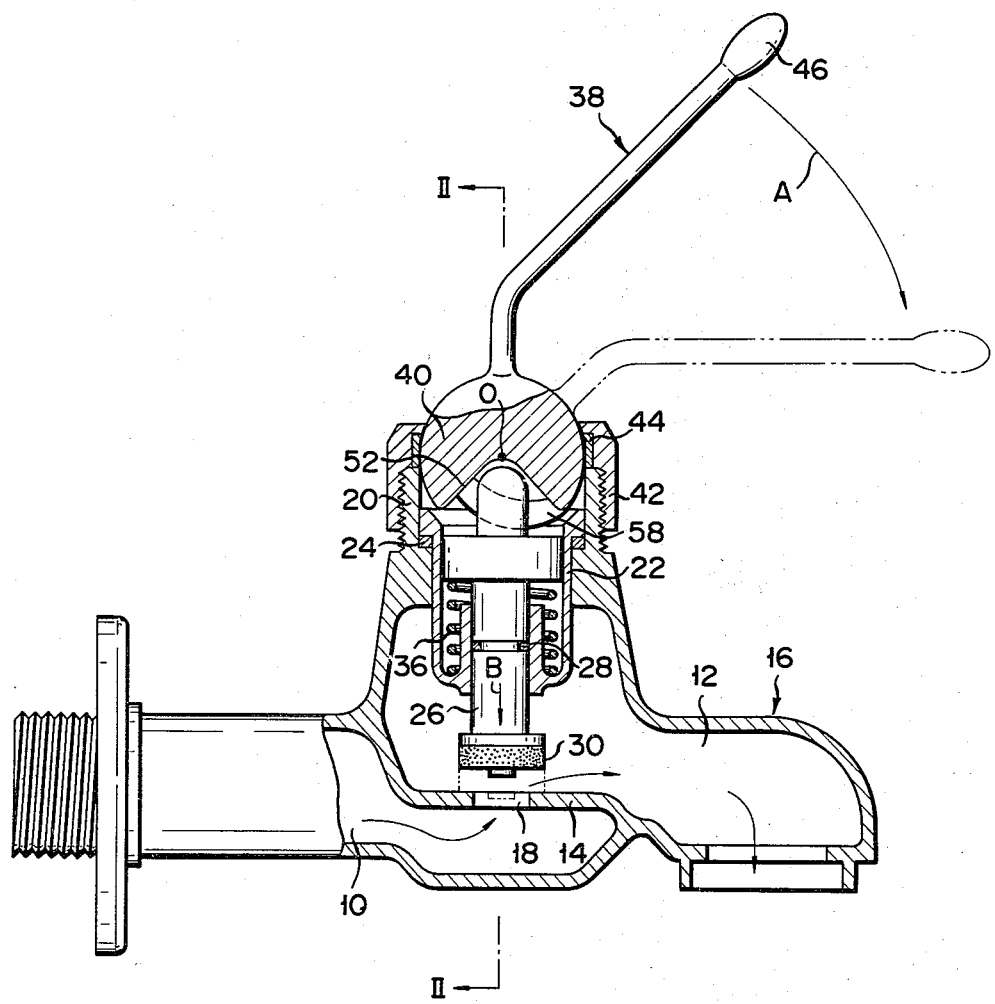
FIG. 1 is a side view showing a water tap according to one embodiment of this invention.
Figure 2:
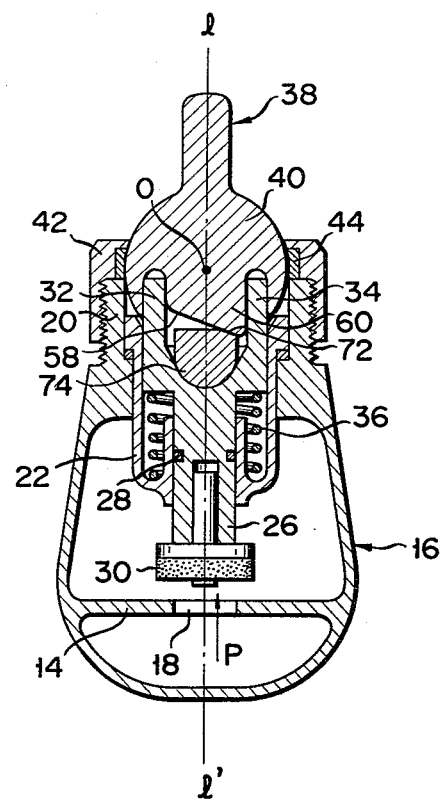
FIG. 2 is a cross-sectional view as taken along line II—II in FIG. 1.

FIG. 1 shows a water tap as used as a water supply. The water tap includes a main body 16 having an inflow passage 10, an outflow passage 12, and a partition wall 14 provided between the inflow and outflow passages. The partition wall 14 has a communication hole 18 for permitting a fluid communication between the inflow and outflow passages. A cavity 20 cylindrical in cross-section is formed, as shown in FIGS. 1 and 2, in a direction of an extension of a center line of the communication hole 18 of the main body 16. A cylinder 22 having inner and outer cylindrical sections is inserted into the cavity 20 of the main body 16, and a clearance between the outer cylindrical section of the cylinder 22 and the cavity 20 is sealed by an O-ring 24 in a water-tight fashion. A substantially columnar valve body 26 is inserted in the inner cylindrical section of the cylinder 22 such that it is concentric with the communication hole 18 and slidable in the direction of the center line of the communication hole 18. A clearance between the valve body 26 and the inner cylindrical section of the cylinder 22 is sealed by an O-ring 28 in a water-tight fashion. A packing 30 made of an elastic material such as rubber is attached to one end of the valve body 26 located in the vicinity of the communication hole 18. The packing has a transverse cross-section area greater than the inner area of the communication hole 18. As shown in more detail in FIGS. 3 and 4, a pair of projections 32, 34 are formed in a mutually spaced-apart relation on the upper end of the valve body 26. The projections 32 and 34 extend parallel to the center line of the communication hole 18 and have rounded free ends, respectively. A coil spring 36 is coiled around the valve body 26 and is located between the inner and outer cylindrical sections of the cylinder 22. The bottom end of the coil spring 36 abut the inner surface of the bottom wall of the cylinder 22 and the upper end of the coil spring 36 abut a flange formed on the other end of the valve body 26 in a compressive fashion. Therefore, the valve body is urged in the upward direction of FIGS. 1 and 2 by the coil spring. Above the cylinder 20 an operation lever 38 has its one end 40 inserted into the cavity 20 of the valve body 16 as shown in FIGS. 1 and 2. A ring 44 is fitted on the inner surface of a cap 42 which is threaded on the outer surface of the cavity 20, and the end 40 of the operation lever 38 which has a partly-spherical outer surface is sealed by the ring 44 in a water-tight fashion. By so doing, the end 40 of the operation lever 38 is connected in a universal-joint fashion to the main body 16. The other end 46 of the operation lever 38 extends into an outer space as shown in FIG. 1.

The end 40 of the operation lever 38 is disposed opposite to the upper end of the valve body 26 and, as shown in more detail in FIGS. 3 and 4, includes a recess 52 having a first inner surface 48 parallel to the externally extending section of the operating lever 38 and a second inner surface 50 perpendicular to the first inner surface 48. An intersection of the first and second inner surfaces 48 and 50 passes through a center O of the end 40 of the operating lever 38. The widths of the first and second inner surfaces 48 and 50 as measured along said intersection are defined by third and fourth inner surfaces 54 and 56 which are formed opposite to, and parallel to, each other such that they are spaced at a distance somewhat greater than the distance between the outer side surfaces of the projection 32 and projection 34. A cam 60 extends from the first inner surface 48 toward the second inner surface 50. The cam 60 has a projecting surface 58 located on a line which pass a center point of the width of the first and second inner surfaces 48, 50 and acting as a camming surface. The width of the camming surface 58 as measured along said intersection is made somewhat smaller than the distance between the inner side surfaces of the projections 32, 34. As shown in more detail in FIG. 3 the distance between the center O and a first position in which the second inner surface 50 and an edge 63 defined between one side surface 62 and camming surface 58 of the cam 60 intersect each other is made greater than the distance between the center O and a second position in which said edge 63 and first inner surface 48 intersect each other. The distance of the edge 63 as measured toward the center O gradually changes from said first position toward said second position. The camming surface 58 is a surface forming at an intersection angle of substantially 30° with respect to a central rotation axis, not shown, of the cam 60. That is, the camming surface 58 and said one side surface 62 of the cam 60 intersect each other at an angle of $\theta \approx 60°$ as shown in FIG. 4. The distance between said one side surface 62 of the cam 60 and the confronting third inner surface 54 and between the other side surface 64 of the cam 60 and the confronting fourth inner surface 56 is made somewhat greater than the width of each of the projections 32 and 34. A first groove 66 is defined between said one side surface 62 of the cam 60 and the third inner surface 54 and the projection 34 slidably engages the first groove 66 such that it is contacted with said one side surface 62 and third inner surface 54. A second groove 68 is defined between the other side surface 64 of the cam 60 and the fourth inner surface 56 and the projection 32 slidably engages the second groove 68 such that it is contacted with the other side surface 64 and fourth inner surface 56.

In FIG. 2, a line 1—1' shows a plane which includes a rotation locus when the operating lever 38 is rotated with its end 40 as a rotation center. At the other end of the valve body 26 a hole 70 circular in transverse cross-section is formed between the projections 32, 34 such that it extends in the direction of the center axis of the valve body, and has a part-spherical bottom surface as shown in more detail in FIGS. 3 and 4. A cam contact element 74 is positioned in the hole 70. The cam contact element 74 has at its one end a sliding surface 72 slidably contacted with the camming surface 58 of the cam 60. The cam contact element 74 has a part-spherical section at its other end. The sliding surface 72 of the cam contact element 74 is line-contacted with the camming surface 58, as shown in FIG. 2, in a position laterally spaced from the line 1—1'. In operation, when the operating lever 38 takes the position as indicated by a solid line in FIG. 1, the packing 30 of the valve body 26 which is upwardly urged (see FIGS. 1 and 2) by the coil spring 36 is disengaged away from the communication hole 18 of the partition wall 14. A water pressure acts on the packing 30 in a direction as indicated by an arrow P in FIG. 2 by a water stream flowing from the inflow passage 10 side toward the outflow passage 12 side. The water pressure acting in the direction of P and the urging force of the coil spring 36 are transmitted from the sliding surface 72 of the cam contact element 74 to the camming surface 58 at edge 63. As a result, the end 40 of the operating lever 38 is rotated in a counterclockwise direction i.e. in a direction perpendicular to the plane including the 1—1' line in FIG. 2. At this time, the fourth inner surface 56 presses the outer side surface of the projection 32 into frictional engagement therewith and the inner surface of the projection 32 presses the surface 64 of the cam 60 into frictional engagement therewith. At the same time, the side surface 62 of the cam 60 presses the inner side surface of the projection 34 into frictional engagement therewith and the outer side surface of the projection 32 presses the third inner surface 54 into frictional engagement therewith. The greater the water pressure acting in the direction of the arrow P the greater the magnitude of the frictional forces involved in the above-mentioned frictional engagements. As the above-mentioned water pressure becomes greater and greater the operating lever 38 can positively hold the valve body 26 in any position other than a full opened state and a closed state for a relatively long period without being given any external force.

When the operating lever 38 is rotated in the direction of an arrow A in FIG. 1 by applying an external force to its end 46 to bring the lever 38 into a position as shown in a double-dot dash line, the valve body 26 is downwardly moved against an urging force of the coil spring 36, as indicated by an arrow B in FIG. 1, under the camming action of the camming surface 58 of the cam upon the sliding surface 72 of the cam contact element 74. As a result, the packing 30 is brought into a first position where it is abutted against the partition wall 14 to close the communication hole 18 in a liquid-tight fashion. Even if the external force is removed after the operating lever 38 is brought into the position as indicated by the double-dot dash line, the operating lever 38 is positively held in the above-mentioned position under the action of the above-mentioned frictional engagements. That is, the valve body 26 is positively held in the above-mentioned first position.

Suppose that the operating lever 38 is further operated in the direction of an arrow A in FIG. 1 with the lever still gripped in hand, causing the end 40 of the operating lever 38 to be rotated clockwise in FIG. 2 to permit the above-mentioned frictional engagements to be released. If in this state the operating lever 38 is rotated in a direction opposite to the direction of the arrow A in FIG. 1, the valve body 26 is moved in a direction opposite to the direction of the arrow B in FIG. 1 under the urging force of the coil spring 36 and under the water pressure acting in the direction of P in FIG. 2, causing the communication hole 18 to be opened. When the first inner surface 48 of the recess 52 is abutted against the peripheral surfaces defined between the outer side and inner side surfaces of the projections 32 and 34, the rotational movement of the operating lever 38 in the direction opposite to the direction of the arrow A is stopped. At this time, the valve body 62 is brought into a second position in which the packing 30 is located farthermost away from the communication hole 18.

What is claimed is:
1. A water tap comprising:
    a main body having inflow and outflow passages, a partition wall for partitioning the interior of the main body into said inflow and outflow passages, and a communication hole in said partition wall providing fluid communication between said inflow and outflow passages;
    a valve body having one end and the other end which is located further away from said communication hole than said one end thereof; said valve body disposed in said main body and being movable between a first position in which said one end of said valve body is abutted against said partition wall to close said communication hole in a water-tight fashion and a second position in which said one end of said valve body is located away from said communication hole to permit said communication hole to be opened;
    urging means disposed between said main body and said valve body and urging said valve body into said second position;
    an operating lever having one end mounted in said main body for universal pivotal movement; one end of said operating lever being provided with a pair of grooves extending along a plane including a center axis of said main body, one of which is arranged at one side of said one plane and the other of which is arranged at the other side of said one plane; a cam surface provided on said one end of said operating lever, arranged between said pair of grooves, extending in said plane and slidably contacting with said other end of said valve body for moving said valve body into said first position when said operating lever is rotated in one direction in the plane and for moving said valve body into said second position when said operating lever is rotated in a direction opposite to said one direction;

rotating means provided between said one end of said operating lever and said other end of said valve body and permitting said one end of said operating lever to be rotated by an urging force of said urging means in a direction transverse to said one plane; and a pair of projections provided on said other end of said valve body and extending in the said pair of grooves whereby rotation of said operating lever in a direction transverse to said one plane causes said projections to be frictionally held in said grooves and thereby hold said operating lever in a selected position.

2. A water tap according to claim 1 in which said rotating means is a sliding member provided on said other end of said valve body and adapted to be slidably contacted with said camming surface of said cam in a position laterally of said one plane.

3. A water tap according to claim 2, in which said camming surface of said cam is an inclined surface inclined traverse to said one plane, and said sliding member has an inclined surface which permits a line contact with said camming surface of said cam at a position laterally spaced from said one plane.

4. A water tap according to claim 3, in which said camming surface of said cam lies at an angle of 30° to the central rotation axis of said cam.

5. A water tap according to claim 4, in which said urging means is a coil spring coiled arouned said valve body.

6. A water tap according to claim 5, in which said one end of said valve body is made of an elastic member.

* * * * *